United States Patent [19]

Lewis et al.

[11] 4,160,648
[45] Jul. 10, 1979

[54] FUEL COMPOSITIONS CONTAINING DEPOSIT CONTROL ADDITIVES

[75] Inventors: Robert A. Lewis, Berkeley; Lewis R. Honnen, Petaluma, both of Calif.

[73] Assignee: Chevron Research Company, San Francisco, Calif.

[21] Appl. No.: 801,441

[22] Filed: May 27, 1977

Related U.S. Application Data

[63] Continuation-in-part of Ser. No. 730,495, Oct. 7, 1976, abandoned, which is a continuation-in-part of Ser. No. 700,922, Jun. 29, 1976, abandoned, which is a continuation-in-part of Ser. No. 698,243, Jun. 21, 1976, abandoned.

[51] Int. Cl.$^2$ .................. C10L 1/22; C07C 125/06; C07D 295/14
[52] U.S. Cl. ..................... 44/63; 44/71; 44/64; 260/239 A; 260/239 BC; 544/398; 544/402; 544/382; 544/400; 544/389; 548/320; 560/158; 560/159; 252/542; 252/544; 252/548
[58] Field of Search .............. 44/58, 63, 71; 560/158, 560/159; 260/239 AL, 239 BC; 544/398, 402; 548/320

[56] References Cited

U.S. PATENT DOCUMENTS

| | | | |
|---|---|---|---|
| 2,991,162 | 7/1961 | Malec | 44/71 X |
| 3,359,303 | 12/1967 | Coker et al. | 260/482 C |
| 3,438,757 | 4/1969 | Honnen et al. | 44/58 |
| 3,454,625 | 7/1969 | Eiseman, Jr. et al. | 260/482 C |
| 3,565,592 | 2/1971 | Mehmedbasich | 44/71 X |
| 3,652,240 | 3/1972 | Dorn et al. | 44/71 X |
| 3,658,882 | 4/1972 | Eisemah, Jr. | 260/482 C |
| 3,671,511 | 6/1972 | Honnen et al. | 44/58 X |
| 3,786,081 | 1/1974 | Oppenlaenger et al. | 560/158 X |
| 3,813,341 | 5/1974 | Elliott et al. | 260/482 B X |
| 3,960,515 | 6/1976 | Honnen | 44/63 X |

Primary Examiner—Thomas Waltz
Attorney, Agent, or Firm—D. A. Newell; S. R. LaPaglia

[57] ABSTRACT

Fuel compositions for internal combustion engines are provided which contain deposit control additives which maintain cleanliness of intake systems without contributing to combustion chamber deposits. The additives are polyloxyalkylene carbamates comprising a hydroxy- or hydrocarbyloxy-terminated polyloxyalkylene chain of 2–5 carbon oxyalkylene units bonded through an oxycarbonyl group to a nitrogen atom of a polyamine having from 2 to 10 amine nitrogens and from 2 to 40 carbons with a carbon:nitrogen ratio between about 1:1 and 10:1.

22 Claims, No Drawings

FUEL COMPOSITIONS CONTAINING DEPOSIT CONTROL ADDITIVES

CROSS REFERENCE TO RELATED APPLICATIONS

This is a continuation-in-part of U.S. application Ser. No. 730,495 of Robert A. Lewis and Lewis R. Honnen for "Deposit Control Additives" filed Oct. 7, 1976, which in turn is a continuation-in-part of Ser. No. 700,922, filed June 29, 1976, which in turn is a continuation-in-part of Ser. No. 698,243, filed June 21, 1976, all now abandonded.

BACKGROUND OF THE INVENTION

1. Field of the Invention

In recent years, numerous fuel detergents or "deposit control" additives have been developed. These materials when added to hydrocarbon fuels employed in internal combustion engines effectively reduce deposit formation which ordinarily occurs in carburetor ports, throttle bodies, venturies, intake ports and intake valves. The reduction of these deposit levels has resulted in increased engine efficiency and a reduction in the level of hydrocarbon and carbon monoxide emissions.

Thus, the introduction of fuel compositions containing deposit control additives has resulted in many cases in the reduction of harmful atmospheric pollutants and, since greater engine efficiencies are maintained, fuel savings.

A complicating factor has, however, recently arisen. With the advent of automobile engines that require the use of non-leaded gasolines (to prevent disablement of catalytic converters used to reduce emissions), a serious problem has arisen in providing gasoline of high enough octane to prevent knocking and the concomitant damage which it causes. The chief problem lies in the area of the degree of octant requirement increase, herein called "ORI", which is caused by deposits formed in the combustion chamber while the engine is operating on commercial gasoline.

The basis of the ORI problem is as follows: each engine, when new, requires a certain minimum octane fuel in order to operate satisfactorily without pinging and/or knocking. As the engine is operated on any gasoline, this minimum octane increases and, in most cases, if the engine is operated on the same fuel for a prolonged period will reach equilibrium. This is apparently caused by an amount of deposits in the combustion chamber. Equilibrium is typically reached after 5000 to 15,000 miles of automobile operation.

Octane requirement increases at equilibrium with commercial gasolines, in particular engines will vary from 5 to 6 octane units to as high as 12 or 15 units, depending upon the gasoline compositions, engine design and type of operation. The seriousness of the problem is thus apparent. A typical 1975 or 1976 automobile with a research octane requirement of 85 when new may after a few months of operation require 97 research octane gasoline for proper operation, and little unleaded gasoline of that octane is available. The ORI problem exists in some degree with engines operated on leaded fuels. U.S. Pat. Nos. 3,144,311 and 3,146,203 disclose lead-containing fuel compositions having reduced ORI properties.

It is believed, however, by many experts that the ORI problem, while present with leaded gasolines, is much more serious with unleaded fuel because of the different nature of the deposits formed with the respective fuels, the size of increase, and because of the lesser availability of high-octane non-leaded fuels. This problem is compounded by the fact that the most common means of enhancing the octane of unleaded gasoline, increasing its aromatic content, also appears to increase the eventual octane requirement of the engine.

The problem is compounded by the recently discovered fact that some of the presently used nitrogen-containing deposit control additives and the mineral oil or polymer carriers commonly used with such additives appear to contribute significantly to the ORI of engines operated on unleaded fuel.

It is, therefore, highly desirable to provide fuel compositions which contain deposit control additives which effectively control deposits in intake systems (carburetor, valves, etc.) of engines operated with fuels containing them, but do not contribute to the combustion chamber deposits which cause increased octane requirements.

2. DESCRIPTION OF THE PRIOR ART

U.S. Pat. No. 3,359,303 discloses reaction products of polyalkyleneoxy alkyl 1-aziridine carboxylates with polyamines. These materials are disclosed as being curing agents (crosslinking agents) for epoxy resins. The alkyleneoxy chains contain a maximum of 22 alkyleneoxy units.

U.S. Pat. No. 3,658,882 discloses certain aryl carbamates and quaternary derivatives thereof useful as antistatic agents.

SUMMARY OF THE INVENTION

Deposit control additives are provided which maintain cleanliness of engine intake systems and do not themselves contribute to combustion chamber deposits. The deposit control aditives are poly(oxyalkylene) carbamates soluble in a hydrocarbon fuel boiling in the gasoline range. The carbamates comprise at least one hydroxy- or hydrocarbyloxy-terminated poly(oxyalkylene) chain of 2 to 5 carbon atom oxyalkylene units bonded through an oxycarbonyl group to a nitrogen atom of a polyamine having from 2 to 10 amine nitrogens and from 2 to 40 carbons with a carbon-to-nitrogen ratio between about 1:1 and 10:1. The alkoxy group will contain from 1 to 30, preferably 2 to 20 carbon atoms. The compounds will have molecular weights in the range of about 500 to 10,000, preferably from 800 to 5000.

The preferred compounds may be described by the following general formula:

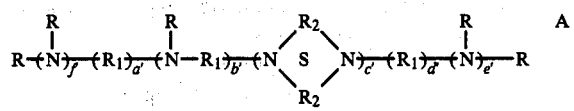

wherein R is the same or different constitutent selected from
(I) hydrogen,
(II) hydrocarbyl of 1 to 10 carbon atoms,
(III) hydrocarbonyl of 2 to 10 carbon atoms, and
(IV) a group of the formula

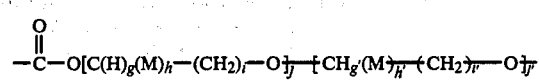

-continued

in which g, g' and g" are integers 1 to 2; h, h' and h" are 0 or 1; i, i' and i" are integers 1 to 3; the sum of g and h is 2; M is methyl or ethyl; j, j' and j" are integers and the sum of j+j'+j" is such that the molecular weight of IV is in the range of 500 to 5000. Z is H or hydrocarbyl of 1 to 30 carbons. $R_1$ is the same of different alkylene or hydroxy-substituted alkylene radical of 2 to 6 carbon atoms, $R_2$ is carbonyl, alkyl carbonyl or alkylene of 2 to 4 carbon atoms with vicinal linkages. At least one, and preferably not more than two of the R groups are IV and sufficient of the oxyalkylene units in IV are other than ethyleneoxy to render the compound soluble in hydrocarbon fuel boiling in the gasoline range. a' is 0 to 1, preferably 1; b' is an integer 0 to 4, preferably 0 to 2; c' is 0 or 1, preferably 0; d' is 0 or 1, preferably 0; e' is 0 or 1, preferably 1; and f' is 0 or 1, and equal to 1 when c' is 0.

The preferred, but not all, polyoxyalkylene oxycarbonyl radical substituted amines which find use in this invention can be broadly described by the following general formula:

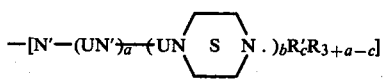

wherein U is an alkylene having from 2 to 6 carbon atoms, there being at least 2 carbon atoms between the nitrogen atoms and preferably of from 2 to 3 carbon atoms; a is an integer from 0 to 5, and preferably of from 0 to 4; b is 0 to 1, preferably 0 when a is greater than 0; a+2b is equal to an integer between 0 and 5; c is an integer from 1 to 4, for the average composition being in the range of about 1 to 3, on the average there being fewer R' groups than nitrogen atoms; R is the same or different constitutent selected from hydrogen or a $C_1$ to $C_{10}$ hydrocarbyl or the mono-keto, mono-nitro, mono-hydroxy, alkyleneoxy or alkoxy derivative thereof; and R' is a poly(oxyalkylene) oxycarbonyl radical derived from polymerizing alkylene oxides from 2 to 5 carbon atoms, preferably from 2 to 4 carbon atoms, and more preferably from ethylene oxide and propylene oxide, and having an average molecular weight in the range of 600 to 5000 and chloroformylating said radical with phosgene. Illustrative compounds within the above formula are N-[poly(oxypropylene)oxycarbonyl] ethylenediamine, N[poly(oxypropylene)polyoxyethyleneoxycarbonyl] diethylenetriamine.

The additives are usually prepared by the reaction of a suitable polyether alcohol with phosgene to form a chloroformate followed by reaction of the chloroformate with a mono- or polyamine to form the active carbamate.

DETAILED DESCRIPTION OF THE INVENTION

The Amine

The amines employed in preparing the additives are as described in formula A with the exception that R will not be of Type IV (which is derived from the polyether chloroformate).

Polyamine Component

The polyamine component embodies a broad class of amines having from 2 to 10 amine nitrogens and from 2 to 40 carbons with a carbon to nitrogen ratio between about 1 and 10:1. In many instances, the amine component is not a pure single product, but rather a mixture of compounds having a major quantity of the designated amine. For the more complicated polyamines, the compositions will be a mixture of amines having as the major product the compound indicated in the average composition and having minor amounts of analogous compounds relatively close in compositions to the dominant compounds.

Exemplary R groups of the amine precursor include alkyls such as methyl, ethyl, propyl, butyl, isobutyl, pentyl, hexyl, octyl, etc., alkenyls such as propenyl, isobutenyl, hexenyl, octenyl, etc., hydroxyalkyls, such as 2-hydroxyethyl, 3-hydroxypropyl, hydroxy-isopropyl, 4-hydroxybutyl, 8-hydroxyoctyl, etc., ketoalkyls such as 2-ketopropyl, 6-ketooctyl, etc., alkoxy and lower alkyleneoxy alkyls, such as ethoxyethyl, ethoxypropyl, propoxyethyl, propoxypropyl, diethyleneoxyethyl, triethyleneoxyethyl, tetraethyleneoxyethyl, diethyleneoxyhexyl, diethyleneoxyoctyl, etc., acetyls such as propionyl, etc. The preferred R groups are hydrogen, $C_1$ to $C_6$ alkyls and $C_1$ to $C_6$ hydroxyalkyls.

Illustrative $R_1$ groups are ethylene, 1,2-propylene, 2,2-dimethyl propylene, trimethylene, tetramethylene, hexamethylene, 1,3-2-hydroxypropylene, etc. The preferred alkylene groups are ethylene and trimethylene.

As already indicated, in many instances a single compoud will not be used as a reactant in the preparation of the compositions of this invention. That is, mixtures will be used in which one or two compounds will predominate with the average composition or molecular weight as indicated. For example, tetraethylene pentamine prepared by the polymerization of aziridine or reaction of dichloroethylene and ammonia will have both lower and higher amino members, e.g., triethylene tetramine, substituted piperazines and pentaethylene hexamine, but the composition will be mainly tetraethylene pentamine and the empirical formula of the total composition will closely approximate that of tetraethylene pentamine.

The Polyethers

The polyethers or poly(oxyalkylene) materials which are utilized in preparing the polyether carbamates are condensation polymers of the lower aliphatic oxides such as ethylene oxide, propylene oxide, the butylene oxides and the pentylene oxides. The preferred materials are the propylene oxide polymers or poly(propylene glycol). These materials may be terminated or capped on one end by a suitable hydrocarbyl group. For example, particularly preferred materials are capped with a butyl, oleyl groups, etc. Also suitable are materials which are capped with mixtures of alkyl groups, i.e., with a mixture of $C_{16}$, $C_{18}$ and $C_{20}$ alkyls. While materials with two terminal hydroxyl groups can be employed, the use of a material containing but one is preferred since chloroformylation will produce a preferred monochloroformate which can then be reacted with a suitable amine to produce the preferred carbamyl material. However, even though some dicarbamate will be formed with the dihydroxy materials, the presence of small amounts of these materials are, though not preferred, not detrimental to the performance of the materials.

The materials may be prepared from mixture of oxide monomers, i.e. when the reactivities of the oxides are relatively equal, random polymers can be prepared. In certain cases, with ethylene oxide, in combination with other oxides, the ethylene oxide reaction rate is much greater, and random polymers cannot be easily prepared. In those cases, block copolymers are prepared.

A particular type of polymer that can be prepared and has been commercially prepared are represented by materials which are prepared by polymerizing propylene oxide to form a first material and then polymerizing ethylene oxide on one or both ends of the poly(oxypropylene). Materials of this type are marketed by Wyandotte Chemicals as "Pluronics".

Preparation of the Polyether Carbamates

The additives of this invention may be most conveniently prepared, as has been previously noted, by reaction of phosgene with the poly(oxyalkylene) compound followed by reaction of the product with a suitable amine.

The reaction of the poly(oxyalkylene) material is carried out on an essentially equimolar basis utilizing only a slight excess of phosgene, although an excess of phosgene is not detrimental. The reaction may be carried out at temperatures from $-10°$ to $100°$ C., preferably in the range of $0°$ to $30°$ C. The reaction will usually be complete within $\frac{1}{4}$ to 5 hours. Times of reaction will usually be in the range of from $\frac{1}{2}$ to 3 hours.

A solvent may be used in the chloroformylation reaction. Suitable solvents include benzene, toluene, etc. It is preferred that the phosgene be dissolved in a suitable solvent before reaction with the poly(oxyalkylene) material.

The reaction of the chloroformate with the amine may be carried out neat or in solution. The molar ratio of amine to chloroformate will usually be in the range of 0.5 to 5. Temperatures of from $-10°$ to $200°$ C. may be utilized. The desired product may be obtained by water wash and stripping, usually by the aid of vacuum, of any residual solvent.

The mol ratio of the polyether chloroformates to amine will generally be in the range from about 0.2 to 20 mols of amine per mol of chloroformate, and more usually 0.5 to 5 mols of amine per mol of chloroformate. The mol ratio will depend upon the particular chloroformate and the desired ratio of polyether to amine. If suppression of polysubstitution of the alkylene polyamines is desired, large mol excesses of the amine will be used. For example, in particular, preparation with ethylenediamine an amine-chloroformate ratio of 2.5 to 1 has yielded a basic nitrogen to total nitrogen ratio in the product of 0.27, whereas raising the amine chloroformate ratio of 9.1 to 1 gives 0.42 basic nitrogen to total nitrogen ratio, showing a much higher amount of monocarbamate in the material.

The reaction or reactions may be conducted with or without the presence of a reaction solvent. A reaction solvent is generally employed whenever necessary to reduce the viscosity of the reaction product. These solvents should be stable and inert to the reactants and reaction product. Preferred solvents include aliphatic or aromatic hydrocarbons. Depending on the temperature of the reaction, the particular chloroformate used, the mol ratios and the particular amine, as well as the reactant concentrations, the time may vary from $\frac{1}{4}$ to 24 hours, more usually from about 2 to 3 hours. Times greatly in excess of 3 hours do not particularly enhance the yield and may lead to undesirable degradation, especially at higher temperatures. It is therefore preferred to limit the reaction time to less than 3 hours.

After the reaction has been carried out for a sufficient length of time, the reaction mixture may be subjected to extraction with a hydrocarbon or hydrocarbon-alcohol medium to free the product from any low-molecular-weight amine salts which have formed and any unreacted alkylene polyamines. The product may then be isolated by evaporation of the solvent. Small amounts of halogen may be present as the hydrohalide salt of the polyether carbamates.

Depending on the particular application of the composition of this invention, the reaction may be carried out in the medium in which it will ultimately find use, e.g. polyether carriers and be formed at concentrations which provide a concentrate of the detergent composition. Thus, the final mixture may be in a form to be used directly for blending in fuels.

The preferred polyoxyalkyleneoxycarbonyl radical substituted alkylene polyamine compositions have the following formula:

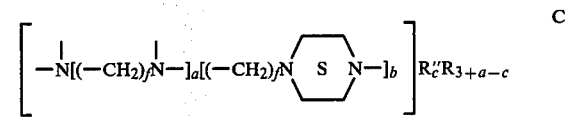

The above symbols are defined as follows: a is an integer from 0 to 5, preferably an integer of from 0 to 4; b is an integer from 0 to 1, preferably 0 when a is greater than 0; $+2b$ is equal to a number between 0 and 5; c is an integer in the range of 1 to 3, on the average there being fewer R groups than nitrogen atoms; f is an integer from 2 to 3; R is the same or different constitutent selected from hydrogen or a $C_1$ to $C_{10}$ hydrocarbyl or the monoketo, mononitro, monohydroxy, alkyleneoxy or alkoxy derivative thereof; and R" is a poly(oxyalkylene) oxycarbonyl radical of 600 to 5000 average molecular weight.

The above formulas represent broad and simplified versions of the preferred poly(oxyalkylene) carbamates which may be employed in the practice of the instant invention. It should be recognized that numerous polyether carbamates not defined by the above formulas may be present in minor quantities. Thus, while the above formulas defined preferred poly(oxyalkylene) carbamates present in major quantities, they should not be interpreted as excluding minor amounts of other components.

The polyether carbamates will generally be employed in a hydrocarbon distillate fuel. The proper concentration of additive necessary in order to achieve the desired detergency and dispersancy varies depending upon the type of fuel employed, the presence of other detergents, dispersants and other additives, etc. Generally, however, from 30 to 2000 weight parts per million, preferably from 100 to 700 ppm of polyether-carbamate per part of base fuel is needed to achieve the best results. When other detergents are present, a lesser amount of polyether carbamate may be used. For performance as a carburetor detergent only, lower concentrations, for example 30 to 70 parts per million may be preferred.

The detergent-dispersant additive may be formulated as a concentrate, using an inert stable oleophilic organic solvent boiling in the range of about $150°$ to $400°$ F.

Preferably, an aliphatic or an aromatic hydrocarbon solvent is used, such as benzene, toluene, xylene or higher-boiling aromatics or aromatic thinners. Aliphatic alcohols of about 3 to 8 carbon atoms, such as isopropanol, isobutylcarbinol, n-butanol and the like, in combination with hydrocarbon solvents are also suitable for use with the detergent-dispersant additive. In the concentrate, the amount of the additive will be ordinarily at least 10 percent by weight and generally not exceed 70 percent by weight and preferably from 20 to 60 weight percent.

In gasoline fuels, other fuel additives may also be included such as antiknock agents, e.g., methylcyclopentadienyl manganese tricarbonyl, tetramethyl or tetraethyl lead, or other dispersants or detergents such as various substituted succinimides, amines, etc. Also included may be lead scavengers such as aryl halides, e.g., dichlorobenzene or alkyl halides, e.g., ethylene dibromide. Additionally, antioxidants, metal deactivators and demulsifiers may be present.

A particularly useful additive is a fuel-soluble carrier oil. Exemplary carrier oils include nonvolatile poly(oxyalkylene)s; other synthetic lubricants or lubricating mineral oil. Particularly preferred carrier oils are poly(oxyalkylene) mono and polyols, such as the Pluronics marketed by BASF Wyandotte Corp., and the UCON LB-series fluids marketed by Union Carbide Corp. When used, these oils are believed to act as a carrier for the detergent and assist in removing and retarding deposits. They have been found to display synergistic effects when combined with the polyether carbamates. They are employed in amounts from about 0.05 to 0.5 percent by volume, based on the final gasoline composition.

The following examples are presented to illustrate specific embodiments of the practice of this invention and should not be interpreted as limitations upon the scope of the invention.

EXAMPLE 1 —Reaction of Phosgene with Poly(oxypropylene)

A 99 g (1.0 mol) portion of phosgene was condensed into 750 ml of toluene at 0° C. A 450 g (0.17 mol) portion of monobutyl polyoxypropylene having a molecular weight of about 2400 was added as a slow stream to the phosgene-toluene mixture over a period of ½ hour while maintaining the temperature at 0°-10° C. 200 ml of benzene were added. The temperature was raised to 80° and excess phosgene and benzene were distilled from the product. A small sample was taken; toluene was evaporated from it. Infrared analysis showed a strong chloroformate absorption at 1790 cm$^{-1}$.

EXAMPLE 2 —Reaction of Poly(oxypropylene Chloroformate with Amine

One half of the product from Example 1 (in toluene solution) was added at room temperature to 154 g (1.5 mols) of diethylenetriamine in 500 ml of toluene. Immediate precipitation of an amine hydrochloride occurred. The mixture was stirred for one-half hour, filtered and the toluene was removed in a rotary evaporator.

The residue was dissolved in 1-½ volumes of hot n-butanol was extracted three times with 100–200 ml of hot water. The butanol was removed by vacuum providing 200 g of a product which contained 1.17% nitrogen and 0.80% basic nitrogen by ASTM D-2896. Infrared analysis revealed a typical carbamate absorption at 1725 cm$^{-1}$. This product is designated Compound I.

EXAMPLE 3

Following the procedures of Examples 1 and 2, polyether carbamate amines were prepared from the same butyl-capped poly(oxypropylene) and the following amines giving products having the designated percent nitrogen.

| Compound | Amine | Wt. % Nitrogen |
|---|---|---|
| II | triethylenetetramine | 1.46 |
| III | dimethylaminopropylamine | 1.07 |
| IV | hydroxyethylethylenediamine | 0.84 |

EXAMPLE 4

Following the procedure of Examples 1 and 2, but using a monobutyl-capped poly(oxypropylene) of about 1800 molecular weight, the following carbamates were prepared.

| Compound | Amine | Wt. % Nitrogen |
|---|---|---|
| V | ethylenediamine | 0.83 |
| VI | diethylenetriamine | 1.36 |

A 35.4 g portion of product VI was chromatographed on a silica gel column (2" dia. ×7"), eluting with 1 liter of ethyl acetate; ethyl acetate:methanol, 4:1; and ethyl acetate:methanol:isopropyl amine 7:2:1. The first fraction, 13.8 g, was found by infrared to be predominantly unreacted poly(oxypropylene). The latter two fractions, 20.7 g, were identified by the carbonyl absorption as the desired carbamate. This material was designated VIa.

EXAMPLE 5

Phosgene (27 ml, 37.5 g, 379 mmols) was condensed into an ice trap, and was then transferred to a 2 l, 3-neck flask containing toluene (500 ml) at −10° C. The flask was equipped with a gas inlet, mechanical stirrer, addition funnel and gas outlet leading to a caustic trap. Polypropylene glycol monobutyl ether, mw 1810 (500 g, 276 mmols), was then added over about 1 hour. After addition was complete, the mixture was stirred an additional half-hour at room temperature and then sat overnight under a nitrogen blanket. A small sample stripped of toluene on the rotary evaporator showed a strong infrared absorption at 1790 cm$^{-1}$, indicating formation of the chloroformate.

One half of the above product (138 mmols) was added with stirring to diethylenetriamine (138 g, 1340 mmols) in toluene (150 ml). The reaction was exothermic, the temperature rising to 42° C. White amine hydrochloride salts precipitated immediately. The mixture was stirred 2 hours, stripped of toluene, diluted with 3 volumes of n-butanol, and washed four times with hot water (80° C., 200 ml). The organic phase was stripped of n-butanol on the rotary evaporator to yield 240 g of the carbamate as a colorless oil. % Nitrogen=1.42% or 64% of theory based on 1900 mw. The product exhibited a strong infrared absorption at 1725 cm$^{-1}$, and the 1790 cm$^{-1}$ band was gone.

EXAMPLE 6—Preparation of Poly(oxybutylene)

The experiment was carried out in dry glassware under an inert atmosphere. Potassium (1.17 g, 0.03 mol) was added to 26.34 g (0.1 mol) of a phenol alkylated with propylene tetramer. The mixture was stirred and heated to 50° C. for 24 hours until the potassium dissolved. The pot temperature was raised to 80° C. and 1,2-epoxybutane (215 ml, 2.5 mols) was added at a rate slow enough to prevent flooding of the condenser. The reaction was stirred and heated at reflux until the pot temperature reached 125° C. The product was extracted into 2 volumes of diethyl ether and washed with two volumes of 0.5 N HCl. Diethyl ether (250 ml) was added to the ethereal layer, and it was washed four times with 250-ml aliquots of water. The solvent was removed and the product was azeotroped with toluene to remove traces of water. A yield of 145 g of a viscous liquid of molecular weight approximately 1500 was obtained.

EXAMPLE 7—Reaction of Poly(oxybutylene) with Phosgene

Phosgene (14 ml, 0.198 mol) was condensed and transferred to a flask containing 150 ml of toluene. This mixture was cooled and stirred in an ice bath while the poly(oxybutylene) of Example 6 (140 g, 0.09 mol) was added dropwise. After the addition was complete, the ice bath was removed and the mixture was stirred for about 1 hour. An aliquot was taken, and the infra-red spectrum of its non-volatile residue showed a strong chloroformate absorption at 1785 nm.

EXAMPLE 8—Reaction of Poly(oxybutylene) chloroformate with Amine

Ethylenediamine (41 ml, 0.61 mol) was stirred rapidly and cooled in an ice bath. The chloroformate of Example 7 was diluted with four volumes of toluene and added to the ethylenediamine at such a rate that the pot temperature did not exceed 30° C. After the addition was completed, the ice bath was removed and the mixture was stirred for about 1 hour.

The mixture was extracted into 500-ml of hot n-butanol and washed four times with 500-ml aliquots of hot water. The solvent was removed and the product was azeotroped with toluene to remove traces of water, giving 125 g of a viscous amber liquid of molecular weight about 1600. The product contained 1.20% by weight nitrogen and dispersed sludge at 200–400 ppm after 20 minutes.

EXAMPLE 9

The procedures used for the polymerization of 1,2-epoxybutane was the same as that employed in Example 6, execpt that a monobutoxy-capped poly(oxypropylene) material of molecular weight about 800, UCON LB165, was used in place of the phenol alkylated with propylene tetramer. The preparation of the chloroformate and ethylenediamine carbamate were also similar to the preceding examples.

The product, an amber liquid of molecular weight about 1800, contained 1.52% by weight nitrogen.

EXAMPLE 10

In a manner similar to that described above, poly(oxypropylene) carbamates were prepared from amines having the following structures:

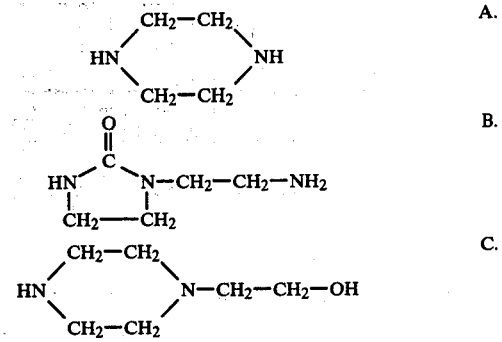

The polyether carbamates were blended in gasoline and their deposit reducing capacity tested in an ASTM/CFR Single-Cylinder Engine Test.

In carrying out the tests, a Waukesha CFR single-cylinder engine is used. The run is carried out for 15 hours, at the end of which time the intake valve is removed, washed with hexane and weighed. The previously determined weight of the clean valve is substracted from the weight of the valve. The differences between the two weights is the weight of the deposit with a lesser amount of deposit measured connoting a superior additive. The operating conditions of the test are as follows: water jacket temperature 100° C. (212° F.); manifold vacuum of 12 in Hg, intake mixture temperature of 50.2° C. (125° F.); air-fuel ratio of 12; ignition spark timing of 40° BTC; engine speed is 1800 rpm; the crankcase oil is a commercial 30W oil. The amount of carbonaceous deposit in milligrams on the intake valves is measured and reported in the following Table I.

The base fuel tested in the above extended detergency test is a regular octane unleaded gasoline containing no fuel detergent. The base fuel is admixed with varying amounts of detergent additives.

TABLE I

| Additive Carrier Description | ppm | Intake Valve Deposit Tests[1] Average Washed Deposit, mg | |
|---|---|---|---|
| | | 11A Engine | 12A Engine |
| Base Fuel | — | 259[2] | 102[3] |
| IV | 200 | 24 | 27 |
| PPG-1450[4] | 300 | | |
| V | 333 | 12 | 6 |
| PPG-1800[4] | 167 | | |
| V | 200 | 33 | 18 |
| PPG-1450[4] | 300 | | |
| VI | 500 | 6 | 15 |
| VIa | 125 | 14 | 45 |
| PPG-1800[4] | 375 | | |
| VIa | 125 | 16 | 23 |
| PPG-1450[4] | 275 | | |

[1]Single evaluations unless noted.
[2]Average of 8 runs.
[3]Average of 4 runs.
[4]The designation PPG-x refers to a monobutyl-capped poly(oxypropylene) glycol of about x molecular weight.

The above results show the significant reduction in valve deposits achieved compared with base fuel.

In order to show the effect of addition of a poly(oxyalkylene) carrier on deposits, 12A Engine Deposit Tests were performed as above using various combinations of Additive VI and PPG-1450 (see description above). These results are set forth in Table IA.

TABLE IA

Intake Valve Deposit Tests on Combinations of
Polyoxyalkylene Carbamate and Polyoxyalkylene Glycol

| Run | Total Additive, ppm | VIa, ppm | PPG-1450, ppm | Average Washed Deposits, ppm |
|---|---|---|---|---|
| 1 | 0 | 0 | 0 | 103 |
| 2 | 250 | 50 | 200 | 144 |
| 3 | 250 | 100 | 150 | 6 |
| 4 | 250 | 125 | 125 | 64,12 |
| 5 | 250 | 150 | 100 | 16 |
| 6 | 250 | 250 | 0 | 114 |
| 7 | 200 | 100 | 100 | 52 |
| 8 | 200 | 200 | 0 | 230 |

These results show that the poly(oxyalkylene) glycol functions as more than a conventional carrier. For example, Runs 3, 4 and 5 containing equal total quantities of glycol and carbamate were much more effective than the carbamate alone of Run 6 or the glycol alone of Run 8.

The additives were evaluated in a laboratory dispersancy test. The hexane-insoluble, chloroform-soluble portion of sludge scraped from the crankcase of high mileage engines was added as a chloroform solution to a typical base gasoline containing varying amounts of the test additive. The concentration of additive necessary to prevent coagulation and precipitation of the sludge for at least 30 minutes was measured.

Table II sets forth these results:

TABLE II

| Compound No. | Conc., ppm |
|---|---|
| I | 150 |
| II | 150 |
| III | 200 |
| IV | 150 |
| V | 300 |
| VI | 150 |

The data indicate that all of these additives are effective dispersants and should, therefore, inhibit valve deposit formation.

The tendency of the additives to contribute to ORI was evaluated in a laboratory engine test. The test engine is a CLR single-cylinder, balanced, high-speed, four-cycle engine designed primarily for oil test and research work. It is manufactured by the Laboratory Equipment Corporation of Mooresville, Indiana. The major engine dimensions are:
Bore—3.80 In.
Stroke—3.75 In.
Displacement—42.5 Cu. In.
Compression Ratio—8:1

The carburetor, intake manifold, and distributor have been slightly modified to facilitate our test procedure. These modifications have made the engine's ORI characteristics comparable to modern-day automobiles.

The test procedure involves engine operation for 80 hours (24 hours a day) on a prescribed load and speed schedule representative of typical vehicle driving conditions. The cycle for engine operation during the test is as follows:

TABLE III

Deposit Accumulation Cycle CLR Single Cylinder

| Mode | Time in Mode, Sec. | Manifold Vacuum, In. Hg | Engine Speed, rpm |
|---|---|---|---|
| 1. Idle | 140 | 16 | 900 |
| 2. Heavy Cruise, Low Speed | 70 | 7 | 2000 |
| 3. Light Cruise, Low Speed | 140 | 13 | 2000 |
| 4. Deceleration | 140 | 18 | 1800 |
| 5. Heavy Cruise, Low Speed | 70 | 7 | 2000 |
| 6. Light Cruise, Low Speed | 140 | 13 | 2000 |
| 7. Idle | 210 | 16 | 900 |
| 8. Heavy Cruise, Low Speed | 70 | 7 | 2000 |
| 9. Light Cruise, Low Speed | 70 | 13 | 2000 |
| 10. Heavy Cruise, High Speed | 70 | 9 | 2500 |
| 11. Light Cruise, High Speed | 140 | 15 | 2500 |
| 12. Deceleration | 140 | 18 | 1800 |

All of the test runs were made with the same base gasoline, which was representative of commercial unleaded fuel. The results are set forth in Table IV.

TABLE IV

Laboratory ORI Test Results

| Run | Additive, Carrier Description | Concentration, ppm | Combustion Chamber Deposits, g | ORI |
|---|---|---|---|---|
| 159 | — | — | — | 3.4 |
| 161 | Commercially available nitrogen-containing DCA Mineral carrier oil | 467 1600 | — | 7.1 |
| 163 | — | — | 1.2 | 2.4 |
| 164 | VI | 500 | 1.6 | 4.2 |
| 165 | (Same as 161) (Same as 161) | 300 1000 | 2.1 | 5.5 |
| 167* | VI | 500 | 1.6 | 5.8 |
| 168 | — | — | 1.4 | 3.6 |
| 169 | V PPG-1450** | 286 214 | 1.3 | 2.5 |
| 170 | V PPG-1450** | 286 214 | 1.6 | 2.4 |

*Air-fuel ratio during the idle portions of the test cycle was off specification during Run 167.
**See Table I.

Simple arithmetic averages of the results indicate: base fuel gives an ORI of 3.1 and combustion chamber deposits weighing 1.3 g, the commercial additives averaged 6.3 units ORI and had combustion chamber deposits weighing 2.1 g, and the polyether carbamates gave an ORI of 3.7 (3.0 omitting Run 167) and combustion chamber deposits averaging 1.5 g. Generally, these results indicate that the polyether carbamates, which have been demonstrated to be excellent inlet system deposit control additives, do not contribute significantly to increasing octane requirements (over base fuel) of the engines in which they are employed.

The test for evaluating the ability of fuel additives to control carburetor deposits employs a 1973 model year, 240 CID, 6-cylinder Ford engine. The internal bore of the carburetor throttle body is equipped with a thin, removable aluminum sleeve. The difference between sleeve weights determined before and after an engine run represents the change in amount of surface deposit occurring during that run.

For additive evaluation, two test phases are run as set forth in Table V.

TABLE V

Carburetor Deposit Test Procedure

1. Dirty-Up Phase (Starting with Clean Sleeve

| Objective: | Establish deposits on caburetor sleeve. |
|---|---|
| Duration: | 15 hours. |
| Operating | 7 minutes moderate load and speed, 4 |

TABLE V-continued

| | Carburetor Deposit Test Procedure |
|---|---|
| Cycle: | minutes idle. |
| Engine Setup: | Crankcase blowby gases routed to carburetor air inlet. |
| Fuel: | Deposit-forming fuel containing heavy FCC component. |
| Evaluation: | Sleeve weights are determined at the beginning and end of the dirty-up phase, and sleeve deposits are rated visually on a scale of 0 to 10 (10 = clean). |
| 2. Cleanup Phase (Begins with Sleeve Deposits Formed During Dirty-Up Phase | |
| Objective: | Measure additive performance in cleaning up deposits. |
| Duration: | 4 hours. |
| Operating Cycle: | Same as dirty-up phase. |
| Engine Setup: | Crankcase blowby cases diverted from carburetor inlet - EGR shutoff. |
| Fuel: | Commercial-type gasoline containing additive under test. |
| Evaluation: | The sleeve is reweighed and rerated visually. Differences between initial and final values represent additive effectiveness. |

Table VI presents average values for the performance of PPG-amine carbamate additives. Also, presented are values for a commercial deposit control additive having recognized performance in the field. Deposit level changes with a commercial-type unleaded gasoline without additive are also shown.

TABLE VI

| | Carburetor Test Results | | | | |
|---|---|---|---|---|---|
| | | | Average Additive Performance | | |
| | | | Deposit Weight | | |
| | | Concen- tration, | Reduc tion, | Init- | |
| | Runs | ppm | % | ial | Final | Δ |
| PPG-625 EDA Carbamate[2] | 4 | 200 | 88 | 4.9[4] | →8.1[4] | 3.2[4] |
| PPG-625 DETA Carbamate[3] | 1 | 150 | 93 | 4.4 | →8.1 | 3.7 |
| Commercial Additive | 8 | 150 | 91 | 5.3 | →8.4 | 3.1 |
| None | 2 | — | 63 | 4.6 | →6.0 | 1.4 |

[1]Visual Deposit rating (10 = clean).
[2]Similar to Compound V of Example 4.
[3]Similar to Compound VI of Example 4.
[4]Data for 3 runs only.

These data show that the polyether carbamates are as effective carburetor deposit control additives as the recognized commercial additive.

The three additives tested gave carburetor deposit weight reductions ranging from 85%-95% and improvements in visual deposit ratings from initial levels of 5 to final levels as high as 9 on a scale of 10.

All specific embodiments of the invention have been described in detail, and it should be understood that the invention is to be given the broadest possible interpretation within the terms of the following claims.

What is claimed is:

1. A fuel composition comprising a major portion of hydrocarbons boiling in the gasoline range and from 30 to 2000 ppm of a poly(oxyalkylene) carbamate having at least one $C_1$–$C_{30}$ hydrocarbyloxy-terminated poly(oxyalkylene) chain of 2 to 5 carbon oxyalkylene units bonded through an oxycarbonyl group to a nitrogen atom of a polyamine; said polyamine having from 2 to 10 amine nitrogens and from 2 to 40 carbon atoms, said carbamate having a molecular weight of from about 500 to 10,000.

2. The composition of claim 1 wherein the oxyalkylene units contain 4 carbon atoms.

3. The composition of claim 2 wherein the molecular weight is from about 800 to 5,000.

4. The composition of claim 2 wherein the group terminating the poly(oxyalkylene) chain is an alkoxy group containing from 2 to 20 carbon atoms.

5. The composition of claim 4 wherein the alkoxy group is butoxy.

6. The composition of claim 4 wherein the alkoxy group contains 18 carbon atoms.

7. The composition of claim 4 wherein the alkoxy group contains 16 to 20 carbon atoms.

8. The composition of claim 7 wherein the alkoxy group comprises a mixture of $C_{16}$, $C_{18}$ and $C_{20}$ carbon groups.

9. The composition of claim 2 wherein the amine is ethylenediamine.

10. The composition of claim 2 wherein the amine is diethylenetriamine.

11. A fuel composition comprising a major portion of hydrocarbons boiling in the gasoline range and from 30 to 2000 ppm of a compound of the formula

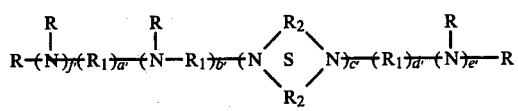

wherein R is the same or different constituent selected from
(I) hydrogen,
(II) hydrocarbyl of 1 to 10 carbon atoms,
(III) hydrocarbonyl of 2 to 10 carbon atoms, and
(IV) a group of the formula

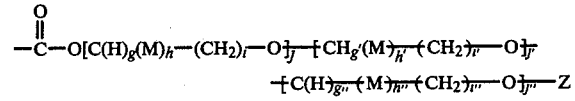

in which g, g' and g" are integers 1 to 2; h, h' and h" are 0 or 1; i, i' and i" are integers 1 to 3; the sum of g and h is 2; M is methyl or ethyl; j, j' and j" are integers and the sum of j, j' and j" is such that the molecular weight of (IV) is 500 to 5,000; Z is hydrocarbyl of 1 to 30 carbon atoms; $R_1$ is the same or different alkylene or hydroxy-substituted alkylene radical of 2 to 6 carbon atoms; $R_2$ is carbonyl, alkyl carbonyl or alkylene of 2 to 4 carbon atoms with vicinal linkages, at least one and preferably not more than two of the R groups are (IV) and sufficient of the oxyalkylene units in IV are other than ethyleneoxy to render the compounds soluble in hydrocarbon fuel boiling in the gasoline range; a' is 0 or 1, b' is an integer 0 to 4, c' is 0 or 1, d' is 0 or 1, e' is 0 or 1 and f' is 0 or 1 and equal to 1 when c' is 0.

12. Composition of claim 11 wherein M is methyl; and g, g', g", h, h', h", i, i' and i" are each equal to 1.

13. Composition of claim 12 in which f', a', b', and e' are each equal to 1 and c' and d' are each 0.

14. Composition of claim 13 in which $R_1$ is propylene.

15. Composition of claim 13 in which $R_1$ is ethylene.

16. Composition of claim 12 in which f', a' and b' are each equal to 1 and c', d' and e' are each 0.

17. Composition of claim 16 in which $R_1$ is propylene.

18. Composition of claim 16 in which $R_1$ is ethylene.

19. The fuel composition of claim 1 which contains in addition from 100 to 5,000 ppm of fuel-soluble poly(oxyalkylene).

20. The fuel composition of claim 19 in which the poly(oxyalkylene) is poly(oxypropylene).

21. A concentrate comprising an inert stable oleophyllic organic solvent boiling in the range of about 150° to 400° F. and from 10 to 20 weight percent of the compound of claim 2.

22. A concentrate according to claim 21 wherein there is present in addition poly(oxypropylene) in the amount of from 7.5 to 80 weight percent.

* * * * *